INVENTORS H. H. ABBOTT
L. A. HOHMANN, JR.
G. W. WELLS
R. C. Winter
ATTORNEY

United States Patent Office 3,420,963
Patented Jan. 7, 1969

3,420,963

COMMUNICATION SYSTEM LINE CIRCUIT PARTICULARLY FOR KEY TELEPHONE SYSTEMS

Henry H. Abbott and Lawrence A. Hohmann, Jr., Middletown, and George W. Wells, Lincroft, N.J., assignors to Bell Telephone Laboratories, Incorporated, New York, N.Y., a corporation of New York Filed July 30, 1965, Ser. No. 475,948
U.S. Cl. 179—99 22 Claims
Int. Cl. H04m *1/00;* H04m *5/00*

ABSTRACT OF THE DISCLOSURE

We disclose a key telephone line circuit which uses transistors and magnetic cores for performing the multiple functions of such a circuit in place of electromechanical relays as generally in the prior art. The line circuit includes a signal source or lamp flashing generator which is unique to the line circuit and responds to the status of the line to provide various signals. A first magnetic core is used in a ringing detector circuit; a second magnetic core is used as a line memory element; and a third magnetic core is used as a hold control element. The hold bridge is provided by transistor circuitry.

This invention relates to communication systems and, more particularly, to key telephone line circuits.

The complexity of modern business organizations creates an increasing demand for key telephone features, such as multiple extension, hold, conference call, and intercommunication services. There is also a growing emphasis on office decor and interior design, the current principles of which clash with the need for telephone apparatus cabinets which usually house circuits required for these key telephone services. Our invention has eliminated those apparatus cabinets, to satisfy conflicting functional and aesthetic requirements, by reducing key telephone service circuit space requirements to the extent that the entire circuit can be accommodated in a telephone subset.

In addition to producing a more pleasing and attractive key telephone subset, a substantial decrease in circuit space requirements provides other important advantages, such as reductions in material, installation time, and the multiple wires required to connect the subset and the apparatus cabinet. Moreover, for held and unanswered calls, the key service lamp wink power which in prior art arrangements was transmitted by the central office or private branch exchange (PBX) over a separate path to the circuits including those equipment cabinets can, in accordance with an aspect of our invention, be replaced by a source of pulsating lamp current individual to each key telephone line.

Accordingly, it is an object of the present invention to provide a more compact circuit for key telephone services and more specifically to eliminate electromechanical devices in the line circuit for key telephone services.

It is another object of the invention to eliminate the apparatus cabinets associated with key telephone circuits.

It is another object of the invention to provide a source of lamp wink power individual to the key telephone line.

It is still another object of the invention to provide a means responsive to incoming and held calls for activating a source of lamp wink power individual to the key telephone line.

Thus, it has been customary, as exemplified in C. E. Morse and J. P. Smith patent application Ser. No. 246,905, filed Dec. 26, 1962, now Patent No. 3,239,610, issued Mar. 8, 1966, to place the line circuitry in a separate cabinet which is connected to the line at some physically convenient place between the subset and the central office or PBX. Those circuits of the prior art, moreover, generate the pulsed power for the line lamp in common equipment at a central office or at a PBX, and transmit this power under line circuit control to the subsets served by the common equipment.

In accordance with the principles of our invention, however, a line circuit relying entirely on solid state devices provides a key telephone system of dramatically reduced size which is accommodated entirely within a telephone subset. Moreover, these solid state devices increase circuit reliability by eliminating those mechanical contacts characterizing the electromagnetic relays used in presently available systems.

Thus the use of solid state devices enables not only the entire line circuit to be placed within the subset, but also permits a lamp flashing generator, which heretofore was an item of common equipment usually located in the central office or PBX, also to be placed in the subset such that the generator is individual to a specific line.

Moreover, we include within the telephone subset a circuit which causes the lamp flashing generator to respond to the status of the line and provide one of several visual signals, each indicative of a specific line condition. Consequently, one signaling generator provides outputs which indicate unanswered terminating calls, answered calls, and held calls on the line associated with the generator. This novel arrangement eliminates both the central sources of lamp power common to several lines and the circuitry required to transmit the power from the sources to the individual lines which has characterized those line circuits in the prior art.

A further aspect of our invention provides a novel means for selectively holding and releasing a connection to the line. In accordance with the invention, this holding means energizes the aforementioned lamp flashing generator in a manner indicative of a hold request at the set.

More particularly, the invention provides at the telephone subset an arrangement of ferrite memory cores to detect ringing as well as answered, held, terminated, and abandoned call conditions. This memory core arrangement, which is not connected to ground to eliminate one source of spurious signals, responds to these line conditions by activating transistors individual to the line, which transistors illuminate a line lamp in a manner indicative of the line status.

The memory cores, moreover, apply a holding bridge to the line or disconnect the holding bridge, as appropriate. This holding bridge comprises a hold impedance in series with a hold transistor, such that the hold transistor, activated in response to the detection of a hold request by the arrangement of memory cores, completes a circuit from the tip to the ring lead of the held line through the hold impedance. A control circuit is connected in parallel with the hold transistor. This control circuit comprises a control transistor which, when activated by the memory core array in response to a discontinue hold request, turns off the hold transistor and subsequently extinguishes itself.

The memory cores of this arrangement, which cores detect the condition of the line and activate the appropriate line circuit transistors in response thereto, are controlled by a reset circuit. The reset circuit alternately charges a condenser which subsequently discharges through windings on individual cores in the array to reset these cores in accordance with the line status. The current pulses established in some of the other windings on the resetting cores provide base currents which activate some of the transistors in the line circuit to produce the appropriate line status signals as hereinbefore mentioned.

It is a feature of the present invention to provide a telephone line circuit having an individual lamp control circuit to provide different interrupted lamp signals; more specifically the lamp control circuit comprises a multivibrator with the ability to vary the period of the lamp flash in accordance with the status of the line circuit.

It is another feature of the present invention to provide an arrangement of memory cores for controlling the operation of the line circuit in response to changes in the status of the line.

It is a further feature of the present invention to provide a reset circuit which is coupled to the memory core arrangement for energizing line circuit transistors appropriate to new line conditions.

It is still a further feature of the present invention to provide a transistor controlled holding impedance; more specifically, a hold transistor is provided to couple the holding impedance to the talking paths, and a control transistor is provided to release the hold transistor and holding impedance from the talking paths, all in response to the status of the memory core arrangement.

It is still a further feature of the present invention to provide a key telephone service line circuit entirely within a telephone subset.

The foregoing and other objects and features may become more apparent by referring now to the following detailed description together with the figures of the drawing in which.

Figure 1:
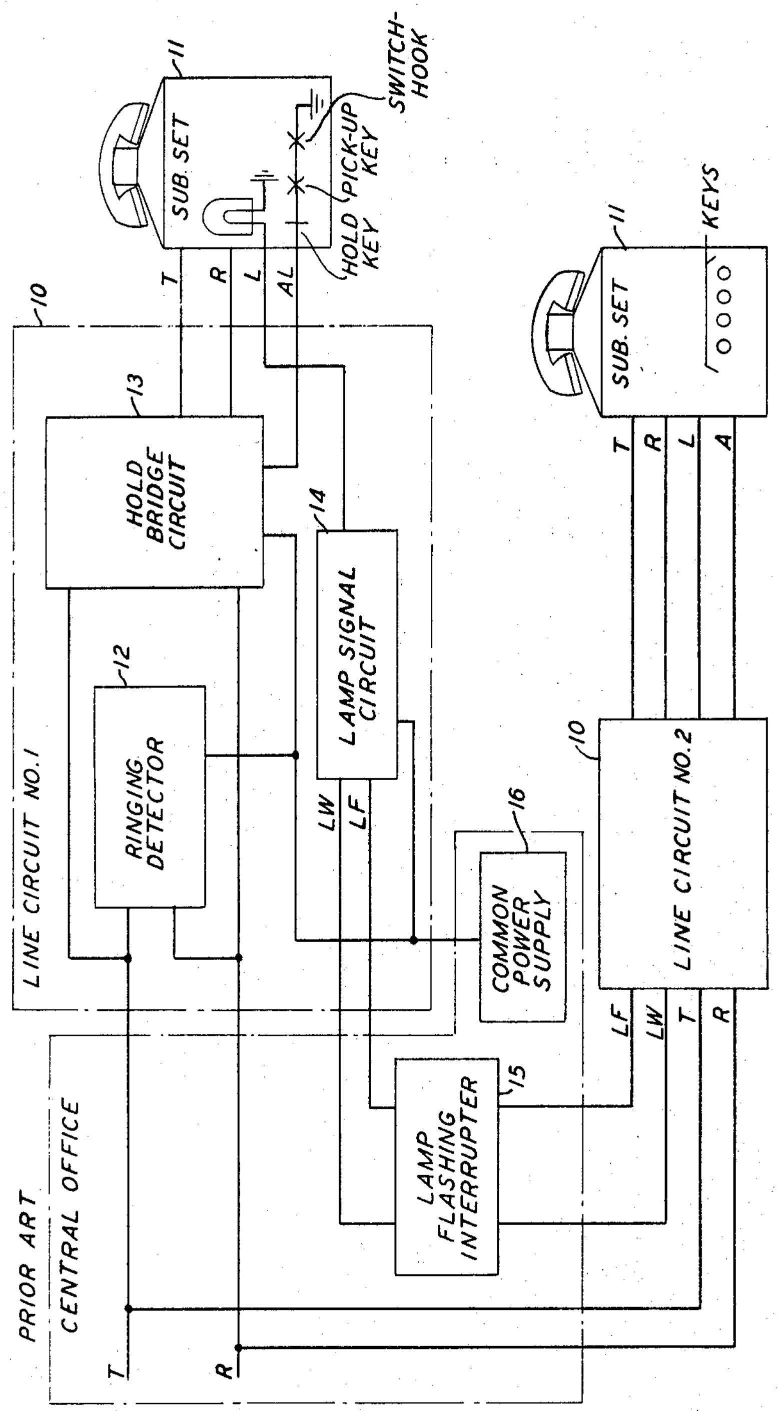
FIG. 1 is a block diagram representation of a key telephone line circuit characterizing the prior art, shown for the purpose of contrast with the present invention.

Turning now to the drawing, an appreciation of our invention can best be gained by first considering the prior arrangements, as exemplified by the block diagram of FIG. 1, wherein the line circuits 10 are housed in a cabinet remote from the telephone subset 11 itself. In the prior art the ringing detector circuit 12, which may comprise a relay, the hold bridge circuit 13, and the lamp signal circuit 14 are all external to the subset and in the line circuit 10. The various lamp control signals, such as flashing and winking signals, are provided over appropriate leads LF and LW from a common circuit in the central office, such as lamp flashing interrupter circuit 15. A common power supply 16 in the central office is also provided. Accordingly, a number of control leads must be extended from the common equipment, such as the central office or a PBX, to each of the line circuits 10. The telephone subset 11 merely includes the normal speech equipment, lamps, and keys, with appropriate leads also extending from the subset to the line circuit. One such prior equipment, identified as the 1A1 Key Telephone System, is described generally in an article of that name by L. H. Allen in the Bell Laboratories Record of April 1956, Volume 34, page 140 et seq.

Figure 2:
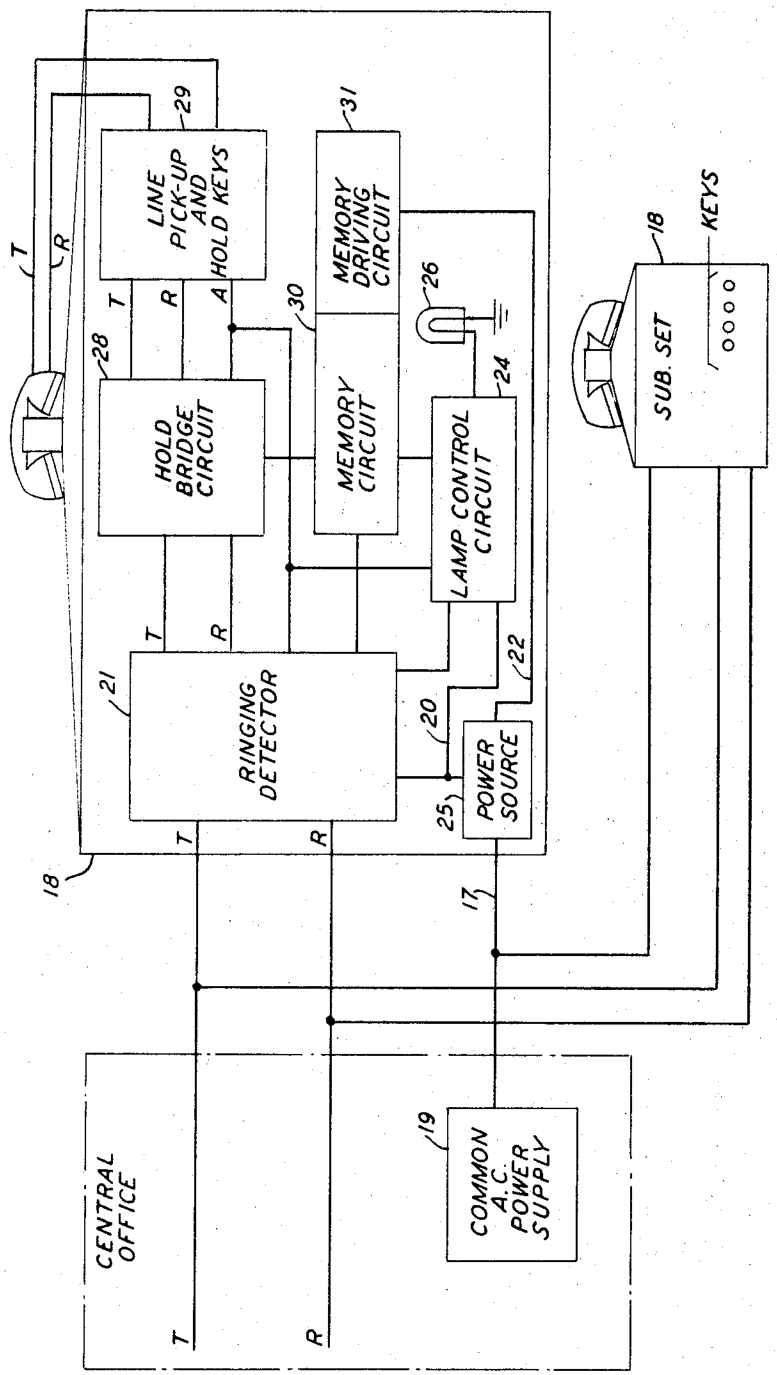
FIG. 2 is a block diagram representation of an exemplary embodiment of the present invention.

In FIG. 2 there is set forth a similar block diagram of one illustrative embodiment of a line circuit in accordance with our invention. An can readily be seen, all equipment of the line circuit is now physically contained within the subset 18. Further, the only external connection from the common equipment at the central office or PBX comprises, in addition to the tip and ring leads, a single lead 17 from a common A.C. power supply source 19.

In this specific embodiment of our invention ringing is detected by a ringing detector circuit 21 which includes a ringing detector magnetic core 23, as described further below with reference to FIG. 3. A lamp control circuit 24 is activated by the various circuits and in turn controls the operation of the signaling light or lamp 26. A hold bridge and control circuit 28 and the normal line pick up and hold keys 29 are also provided. In accordance with an aspect of our invention the hold bridge and control circuit 28 includes a PNPN transistor 32 which is, in part, controlled by a hold PNPN transistor 33 and a hold magnetic core 34, as described further below.

Further in accordance with our invention a unique memory core arrangement is utilized, identified in FIG. 2 as a memory circuit 30, together with a memory driving circuit 31.

Figure 3:
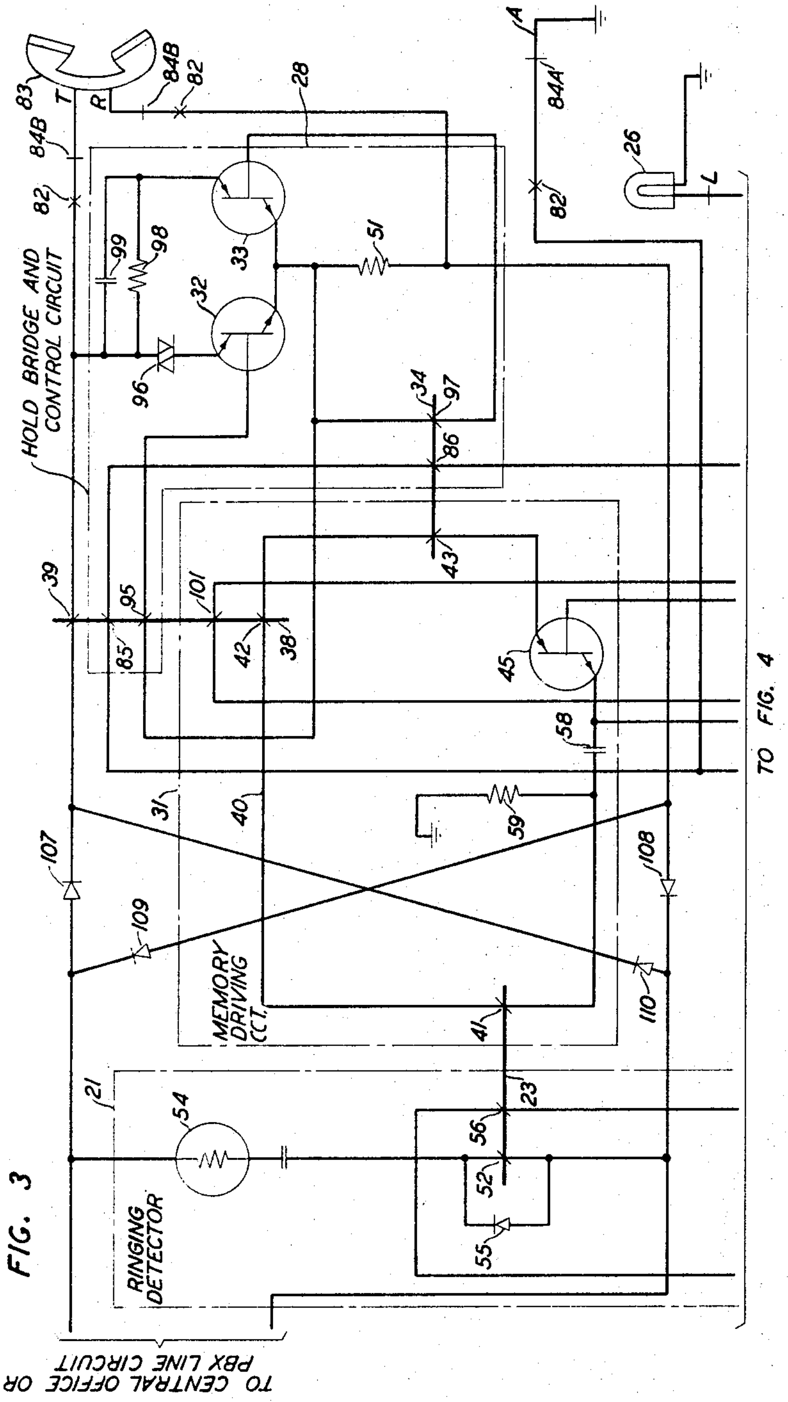
FIGS. 3 and 4, when placed together in an obvious manner, depict a schematic representation of one specific illustrative embodiment of a line circuit for a key telephone system in accordance with our invention.
Figure 4:
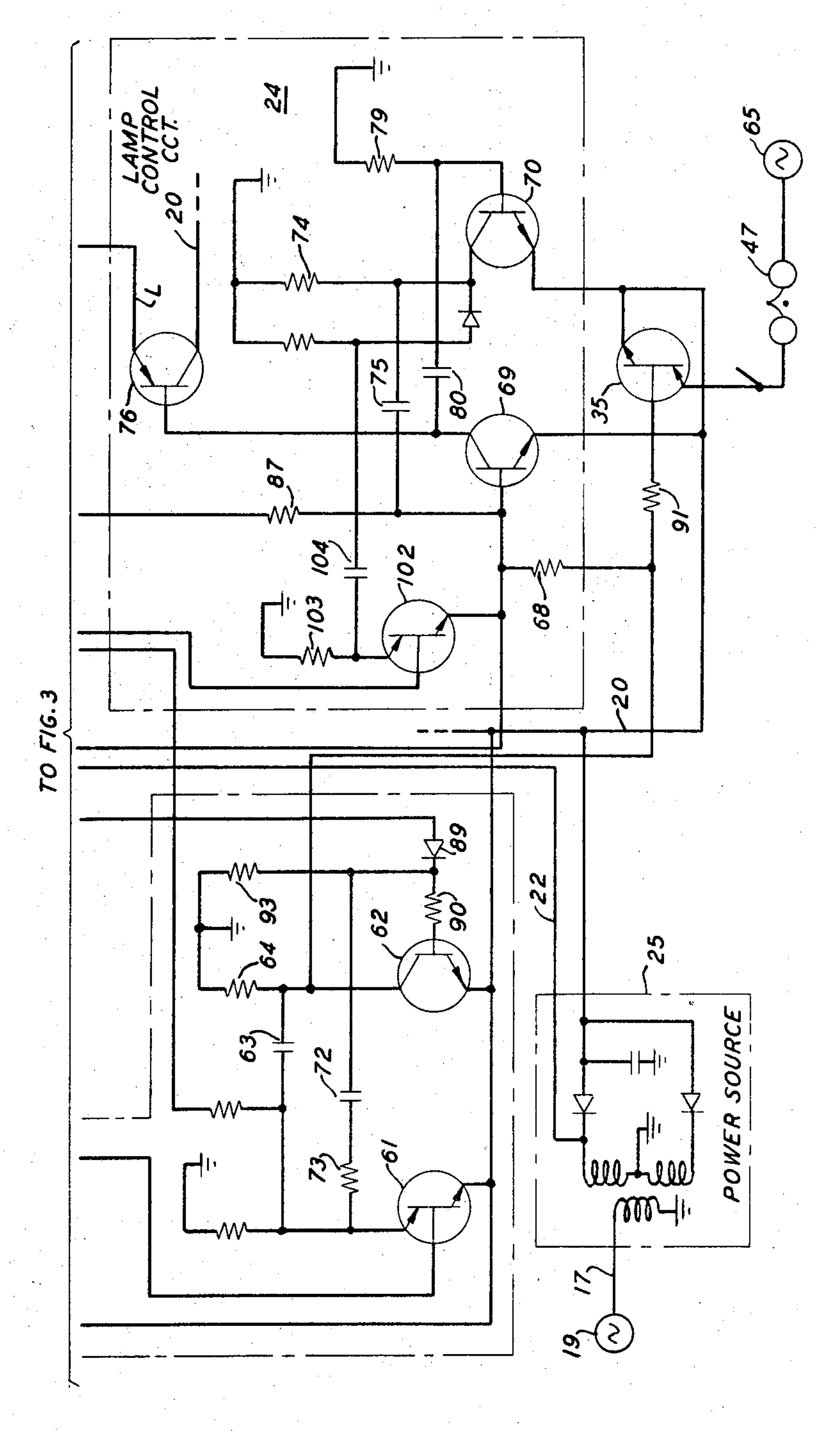

A line circuit for a key telephone system must perform certain operations, and, before describing in detail the specific embodiment depicted in FIGS. 3 and 4, it may be helpful to outline certain salient aspects of the circuit and their function, with reference to FIG. 2. A key telephone system line circuit must recognize ringing, as from the central office or PBX line circuit, and must repeat this ringing at the key telephone, at the same time causing a signal light to be lit in an appropriate manner. As mentioned above, this is accomplished by the ringing detector circuit 21 together with the lamp control circuit 24. The ringing of the key telephone itself is controlled by a ringing control PNPN transistor 35, seen in FIG. 4.

The hold function has been referred to above. Disconnect of the line circuit is controlled by a line memory magnetic core included in the memory core circuit 30; as can be seen in FIG. 3 the line memory magnetic core 38 has one winding 39 connected in the tip lead T of the line circuit.

Each of these magnetic cores may be reset by the memory driving or reset circuit 31 which is driven from a power source 25 in the line circuit over the alternating current power lead 22. The reset circuit includes a lead 40 in series with the reset windings 41, 42, and 43 on the respective magnetic cores and a reset control PNPN transistor 45, which is normally conducting, as discussed further below and shown in FIG. 3.

Our line circuit employs these equipments to perform the various operations of the circuit. These include sounding the ringer 47, under control of the ringing control transistor 35, FIG. 4, and controlling the line lamp 26 to flash in one manner to indicate an unanswered call, under control of the lamp control circuit 24. If a call is to be placed on hold status, the line circuit applies a holding impedance 51 by controlling the hold transistor 32 and illuminates the lamp 26, by the lamp control circuit 24, in a different manner such that the hold status of the line can be clearly identified.

The power source 25, located also within the subset 18, may advantageously include a full wave rectifier, as is known in the art and depicted in FIG. 4, so that application of the alternating current from the common source 19 over the single lead 17 causes both alternating current power to appear on lead 22 within the subset and direct current power on lead 20 within the subset. All of the various active elements are connected to these two power leads and driven thereby.

*Application of ringing signal*

Line circuits usually respond to the transmission of a ringing signal from the central office or PBX through the tip and ring leads, by activating a ringer and causing a line lamp to flicker at a specific rate.

In operation, according to the present invention, however, and as seen in the illustrative embodiment of FIGS. 3 and 4, a ringing signal applied to the T and R leads from a central office or PBX sends current pulses through a winding 52 thereby setting the ringing detector magnetic core 23. A thermistor 54, in series with winding 52, provides a time delay for the current to build up in winding 52 and prevents core 23 from being set falsely by transient signals on the line. A shunt diode 55, moreover, permits core 23 to be set, but not reset, on ringing current.

The core 23 is reset by pulses on lead 40 through the transistor 45 and reset winding 41 of core 23 on each cycle of a 60 cycle per second driving voltage from source 19 over lead 22, thereby switching or resetting the magnetic orientation of the ringing detector core 23 to generate a pulse in output winding 56.

The steep wave front required of the driving pulses to switch the magnetic orientation and reset core 23 is provided by first charging capacitor 58 through a circuit comprising source 25, capacitor 58, resistor 59, and ground. Capacitor 58 then is discharged over lead 40 through the reset circuitry comprising low resistance winding 41 on core 23, the similar windings 42 and 43 on cores 38 and 34, respectively, operated transistor 45, resistor 59, and ground. Transistor 45 is turned off to enable capacitor 58 to charge and turned on to enable the capacitor to discharge in response to the operation of a transistor 61, FIG. 4, as subsequently described.

In accordance with one aspect of our invention, the ringing signal on leads T and R, detected by resetting core 23, in the manner hereinbefore described, causes a current pulse to be applied by output winding 56 to the base of PNPN transistor 61 of sufficient magnitude to turn on the transistor. Transistor 61 turning on, changes the potential on the collector of a transistor 62 through a circuit established from the anode of transistor 61 through a capacitor 63 and resistor 64. This changed collector potential causes normally conducting transistor 62 to turn off. As transistor 62 turns off, the normally nonconducting ringer control PNPN transistor 35, the base of which is connected to the collector of transistor 62 on which the potential is changing, turns on because of this change. When transistor 35 conducts, a common audible signal, such as from a ringer 47, is sounded by a source 65 of alternating current over a path through transistor 35 to negative potential source on lead 20.

The change of potential of the collector of transistor 62 is also applied through resistor 68 to the base of a transistor 69 in the lamp control circuit 24, so that transistor 69 is turned on, thereby triggering a multivibrator including, in this instance, transistors 69 and 70. Operation of this astable multivibrator initiated in the foregoing way causes lamp 26 to flicker in one manner, indicative of a ringing signal, as hereinafter described.

*Continued ringing*

The usual ringing signal applied by the central office or PBX to the tip and ring leads has silent intervals in which no current is applied to the line. It is necessary, however, to continue to sound a ringer at the subset and keep the line lamp flickering in the correct pattern during these silent intervals in the ringing signal. To achieve this result according to the present invention, it is necessary to keep the line lamp 26 and the ringer 47 operating for a period of time greater than the silent interval in the ringing signal, such that the line circuit is in a condition to reoperate these devices during the pulsed portion of the ringing signal.

The reset control PNPN transistor 45, the base of which is connected to the anode of PNPN transistor 61, is turned off when transistor 61 is turned on, thereby blocking the transmission of pulses from an alternating current lead 22 through transistor 45 to the reset conductor 40. The cessation of reset pulses on lead 40 allows core 23 to be set once more if the ringing signal persists. During silent intervals in the ringing cycle, however, no pulses are induced in winding 52 to set core 23. This causes core 23 to remain in the reset condition until a ringing signal is once again applied to the line circuit.

Capacitor 63, connected to the collector of transistor 62, supplies the needed base current for transistor 69 to continue to trigger the multivibrator in the lamp control circuit 24. Capacitor 63 also provides base current to reoperate transistor 35 which activates ringer 47. Moreover, a capacitor 72 and resistor 73, connecting the anode of transistor 61 with the base of transistor 62, provide a discharge time constant which holds transistor 62 inactive for a period of time in excess of the time allotted to the silent interval in the ringing cycle. When the charge on capacitor 72 has dissipated sufficiently, transistor 62 turns on and transmits a pulse through capacitor 63 which interrupts current flow through transistor 61 to turn off transistor 61.

If ringing continues while transistor 62 is inactive, core 23 must be set because the time established by capacitor 72 and resistor 73 to keep transistor 62 turned off longer than the silent interval in the ringing cycle. Reset control transistor 45, reactivated when transistor 62 again turns on, again allows reset pulses to be applied to lead 40 to reset core 23, previously set by the renewed ringing signal during the time transistor 62 was held inoperative. The resetting of core 23 causes a new pulse to appear at output winding 56, re-establishing the sequence hereinbefore described for operating line lamp 26 and ringer 47. This sequence is repeated as long as the ringing signal is applied to the line circuit.

In the multivibrator comprising transistors 69 and 70, conventional reciprocal collector-to-base connections are provided between the transistors. The repetition rate of the multivibrator, which characterizes a ringing signal, is established by transient timing means in the collector-to-base connections. These transient timing means comprise two resistor-capacitor circuits, resistor 79 and capacitor 80, which connect the base of transistor 70 with the collector of transistor 69, and resistor 68 and capacitor 75, which provide the necessary reciprocal connection between the base of transistor 69 and the collector of transistor 70. The values of these resistances and capacitances to produce the desired multivibrator repetition rate are selected according to principles well known in the art.

Transistor 76, the base of which is connected to the collector of multivibrator transistor 69, provides a switch for intermittently applying power to line lamp 26 in response to voltage fluctuations on the collector of transistor 69. Thus, for example, to indicate a ringing signal, power can be applied to lamp 26 at a rate of 60 impulses per minute through a circuit from ground through lamp 26, emitter and collector of transistor 76, to the direct current power lead 20. Thus, the lamp is lighted 0.5 of a second and dark 0.5 of a second. This pulse rate is determined by the conventional resistors and capacitors in the reciprocal collector-to-base connections that have been described previously.

*Answer*

When a call to the line circuit is answered, the ringer must be retired. In addition to deactivating the ringer, it is customary for key telephone systems to provide power which will steadily illuminate the line lamp, the glow of which is usually visible in a translucent line pick-up key, to enable the party answering the call to determine the line over which he is conversing.

Thus, when a call is answered, switchhook contacts 82 are closed to connect receiver or handset 83 to the T and R leads and ground lead A in a conventional manner. Grounding lead A, however, according to one aspect of the present invention, provides a turn-on base potential for transistors 62 and 69. Transistor 69, when turned on through a circuit from ground, through hold switch break contacts 84A, operated switchhook make contacts 82, lead A, winding 85 on core 38, winding 86 on core 34, resistor 87, and base and emitter of transistor 69 to the direct current power lead 20, establishes a collector potential in transistor 69 which is sufficient to provide a base turn-on voltage for transistor 76, thereby enabling transistor 76 to conduct current and steadily illuminate line lamp 26.

Moreover, operation of transistor 62, by grounding the base thereof through a circuit from ground, lead A, contacts 84A and 82, diode 89, and resistor 90, causes a change in the collector potential of transistor 62 which turns off transistor 35 through a circuit to the base of transistor 35 from power lead 20, the emitter-collector path of transistor 62 and resistor 91; this interrupts the circuit from alternating current source 65 through ringer 47 and transistor 35, to deactivate ringer 47.

*Termination of call*

To terminate a call, the line circuit must extinguish the line lamp and, in accordance with the present invention, keep driving pulses circulating in the core reset circuit to enable the line circuit to detect a new ringing signal.

When the call is terminated and handset 83 is restored, a conventional sequence adjustment of switchhook contacts 82 permits the flow of current through lead T to be interrupted before the circuit through lead A to ground is interrupted. This disconnection sequence allows line memory core 38 to remain in the reset condition.

Transistor 62 continues to conduct current because the base is grounded through resistor 93 and, until switchhook make contacts 82 in lead A are released by restoring the handset 83, through lead A over the path previously described. Because transistor 62 is conducting current, core reset control transistor 45 also conducts current, so that core driving pulses continue to be transmitted over reset circuit lead 40 to reset core 23 and enable the line circuit to detect a new ringing signal.

Transistor 69, however, on which the power supply illuminating lamp 26 depends, is deactivated when lead A is ungrounded, and thereby turns off transistor 76 and extinguishes lamp 26. By turning off lamp 26 and turning on transistor 62, the line circuit is restored to a condition which will enable the circuit to detect a renewed ringing signal.

*Holding a call*

To hold a call on the line circuit, it is customary to bridge the tip and ring leads with a holding impedance and disconnect the receiver from these leads.

Thus an established call is held by depressing the hold key associated with the station when handset 83 is off hook. Depressing the hold key operates break contacts 84A which disconnect the A lead from ground while maintaining the T and R lead connection through handset 83. Thus in accordance with another aspect of the invention, current flowing from ground through winding 85 of lead A on line memory core 38 is interrupted while current continues to flow through winding 39 which couples lead T to the line core 38. The net effect produced by the passage of current through winding 39 on tip lead T and the discontinuation of current through A lead winding 85 sets the core 38. Transistor 45 in the core reset drive circuit 31 is normally conductive when transistor 61 is turned off in the absence of a ringing signal; accordingly, reset pulses are applied through reset winding 42 of core 38 to reset core 38.

Resetting core 38 induces a current pulse in the output winding 95 which is connected to the base of hold bridge PNPN transistor 32. The current pulse thus induced in winding 95 operates transistor 32, enabling the transistor to complete a circuit from lead T, through diode 96, transistor 32, and hold impedance 51 to lead R. Releasing the hold key disconnects the T and R leads from handset 83 and does not disturb circuit continuity between the tip and ring leads through transistor 32 and hold impedance 51. Thus the party at this station is able to hold the call on leads T and R and respond to a call on another line associated with the station, or engage in some other activity requiring a temporary interruption of the conversation on the line circuit.

*Removing the hold condition*

To reconnect a receiver to a line on which a call is being held, the hold impedance must be disconnected from the tip and ring leads. The line lamp also must be illuminated steadily to once again provide a visual indication that the receiver is reconnected to the line.

Thus handset 83 is reconnected to leads T and R on which a call is being held and lead A is reconnected to ground by a conventional line pick-up key arrangement. In accordance with a further aspect of the invention, however, grounding the A lead establishes a path for a current pulse through winding 86 on the hold control magnetic core 34, thereby setting core 34. Transistor 61, which remains off when the ringing signal is retired, keeps reset control transistor 45 operated to produce reset pulses on lead 40 in the manner hereinbefore described. These reset pulses on reset winding 43 reset the hold control memory core 34.

Resetting core 34 induces a current pulse in output winding 97 coupled to the base of the hold control transistor 33, which, in series with the parallel combination of resistor 98 and capacitor 99, shunts hold bridge transistor 32. This current pulse in the base of transistor 33 turns on the transistor and substantially short-circuits the hold bridge transistor 32 during the time required to charge capacitor 99. The short circuit established across transistor 32 causes this transistor to release, and, as capacitor 99 completes charging, the very high resistance of resistor 98 in parallel with the capacitor produces the effect of an open circuit which cuts off the flow of current through transistor 33 and turns off transistor 33. Deactivating transistors 32 and 33, in response to a discontinued hold request in the manner described, disconnects hold impedance 51 from leads T and R.

The flow of current through winding 85 to lead A, regrounded in response to a discontinued hold request, resets the line memory core 38 and prevents current pulses from being induced in winding 95 connected to the base of hold bridge transistor 32 and in winding 101 connected to the base of a transistor 102. Cutting off these base currents prevents the transistors from operating.

Regrounding lead A in response to reconnecting the station with the held line circuit also applies a voltage to the base of multivibrator transistor 69, which causes a change in the collector potential thereof sufficient to provide a turn-on voltage for the base transistor 76, to which the collector of transistor 69 is connected. Turning on transistor 76 applies a steady current to lead L and line lamp 26 to illuminate the lamp and indicate that handset 83 is connected to the line circuit.

*Identifying type of call*

In key telephone system it is customary to provide special signals which distinguish an unanswered terminating call from a held call, to inform the party at the subset of the status of the line. This information is provided visually by applying power pulses to the line lamp in two characteristically different repetition rates, each rate identifying one of the two specific line conditions. Consequently, it is a further aspect of the present invention to provide a means for changing the repetition control rate of lamp control circuit 24 to indicate either a ringing signal or a held call.

On application of a ringing signal to leads T and R, the multivibrator comprising transistors 69 and 70 will oscillate in the manner previously described. To identify a held call, however, it is necessary to change the timing transient of the multivibrator in response to a hold request, so the multivibrator will oscillate in a manner characteristic of a held call and produce pulses on line L to illuminate lamp 26 such that the hold status of the line circuit can be perceived with ease.

In accordance with this aspect of the invention, when a hold request is initiated at the station by depressing the hold key, the A lead is disconnected from ground while current continues to course through lead T. As described previously, the current through winding 39 coupling lead T to line memory core 38, and the absence of current in winding 85 on lead A, sets core 38. Reset pulses applied to winding 42 then reset core 38. Resetting core 38 induces, through winding 101, a current pulse in the base of PNPN transistor 102, coupled thereto, which enables the transitor to conduct current through a circuit from ground through resistor 103, anode and cathode of transistor 102, resistor 68, collector and emitter of transistor 62 to power lead 20. The current transmitted through the cathode of operated transistor 102 is applied, moreover, to the base of multivibrator transistor 69 to provide a triggering pulse which initiates operation of the multivibrator.

Operation of transistor 102 establishes a path from the collector of multivibrator transistor 70, through a capacitor 104 to resistor 103 in the base of multivibrator transistor 69 and to ground. The combination of capacitor 104 and resistor 103, connected to the multivibrator which has been operated in response to a hold request, has a different timing transistor than that of capacitor 75 and resistor 68 which determine the repetition rate of the multivibrator when a ringing signal is detected. Thus, for example, if the resistance of resistor 103 is properly chosen in accordance with known astable multivibrator principles, the repetition pulse widths for a hold condition can be altered to turn on transistor 76 to provide power on line L which will illuminate lamp 26 for 0.5 of a second and extinguish the lamp for 0.1 of a second.

Transistor 102 is turned off and requires reoperation when a call is held on leads T and R because the operation of multivibrator transistor 70 causes a voltage pulse to be sent through capacitor 104 with sufficient amplitude to interrupt the current flow between transistor 102 and ground.

Transistor 102 is reoperated by releasing the hold key at the station. Releasing the depressed hold key disconnects handset 83 from the T and R leads by means of the usual mechanical linkage which causes the release of "pick-up" contacts 84B on the up stroke of the hold key. Line current flowing through hold impedance 51 also flows through winding 39 on the T lead to set core 38, while driving pulses provided by transistors 45 in circuit 31 continue to reset core 38 in response to the core setting current in winding 39. The net effect of this sequence of pulses is to produce a train of pulses in winding 101 that keep reoperating transistor 102 which is deactivated each time multivibrator transistor 70 turns on. This reoperation of transistor 102 triggers the multivibrator in the repetition rate characterizing a held call, as previously described.

Diodes 107 and 108 in leads T and R and diodes 109 and 110 bridging the T and R leads constitute a full wave rectifier. This rectifier provides a voltage of a single polarity for hold bridge transistor 32 and transistor 37 if the voltage polarity applied to leads T and R at the central office change.

The features of the invention characterized by the specific circuit described above provide means for detecting ringing signals as well as hold and discontinue hold requests. These detecting means activate a signaling device individual to the circuit in one manner in response to a ringing signal, and in another manner in response to a hold request. Thus the invention provides a reliable circuit which does not require conventional relays and may be housed entirely within the key telephone station.

It is to be understood that the above descriptive arrangements are merely illustrative of the principles of this invention and various other arrangements may be devised by those skilled in the art without departing from the spirit and scope of the invention.

What is claimed is:

1. A communication system line circuit comprising means for selectively holding an external connection, a signal source individual to said line circuit, and means automatically responsive to a hold request for activating said signal source and said holding means, said activating means including a magnetic core having a first output winding connected to said holding means and a second output winding connected to said signal source.

2. A communication system line circuit comprising means for selectively holding an external connection, a signal source individual to said line circuit, means automatically responsive to a hold request for activating said signal source and said holding means, and means responsive to an externally applied ringing signal for enabling said individual signal source to generate a signal corresponding to said ringing signal.

3. A communication system line circuit according to claim 2 and further comprising means for disconnecting said holding means from said line circuit in response to a discontinued hold request.

4. A communication system line circuit according to claim 3 and further comprising means responsive to an off-hook condition on said line circuit for energizing said signal source in a first manner indicative of said off-hook condition and means for energizing said signal source in a second manner in response to said hold request.

5. A key telephone station comprising a line circuit, means for holding a connection to said line circuit, signal generating means individual to the line circuit for energizing a lamp at said station, first memory means for activating said signal generating means in a first manner in response to the application of a ringing signal to said station and second memory means responsive to a hold request by said station for activating said signal generating means in a second manner and for activating said holding means.

6. A key telephone station according to claim 5 wherein said holding means further comprises two transistors connected in parallel.

7. A key telephone station according to claim 6 wherein said second memory means further comprises means for activating one of said transistors in response to a hold request at said station.

8. A key telephone station according to claim 7 wherein said first and second memory means further comprise magnetic cores.

9. A key telephone station according to claim 8 wherein said lamp energizing means further comprises multivibrator means for activating said lamp, first timing transient means for said multivibrator to energize said multivibrator means in said first manner indicative of said ringing signal and second timing transient means for said multivibrator connectable thereto in response to said second memory means to energize said multivibrator means in said second manner indicative of said hold request at said station.

10. A line circuit for a key telephone system comprising a first magnetic memory means for detecting a ringing signal, a multivibrator individual to said line circuit for energizing a line lamp, first timing transient means for said multivibrator responsive to said first magnetic memory means to activate said multivibrator in one manner indicative of a ringing signal, a second magnetic memory means for detecting a hold request, second timing transient means for said multivibrator responsive to said second magnetic memory means to activate said multivibrator in a second manner indicative of said hold request, and means for activating said multivibrator in a third manner indicative of an answered call.

11. A line circuit for a key telephone system according to claim 10 further comprising a first transistor activated by said second magnetic memory means for holding a call on said line circuit, a third magnetic memory means for releasing a held call, and a second transistor activated by said third magnetic memory means for deactivating said first transistor.

12. A line circuit for a key telephone system according to claim 11 further comprising a circuit having a first time constant, first transistor switch means in said first timing transient means coupled to said circuit having a first time constant to trigger said multivibrator to oscillate in said one manner indicative of a ringing signal, a circuit having a second time constant and second transistor switch means in said second timing transient means for coupling said circuit having a second time constant to said multivibrator and to trigger said multivibrator to oscillate in said second manner indicative of said hold request.

13. A line circuit for a key telephone system according to claim 12 further comprising a third timing transient means coupled to said first transistor switch means in said first timing transient means for activating said multivibrator to indicate a ringing signal during silent intervals in said signal.

14. A line circuit for a key telephone system comprising a first magnetic memory device for detecting a ringing signal applied to said line circuit, a first transistor activated when said first memory device detects said ringing signal, a second transistor deactivated by said first transistor, an astable multivibrator having a first timing transient, a third transistor coupled to the collector electrode of said second transistor for triggering said multivibrator when said second transistor is deactivated, and a line lamp illuminated in response to said multivibrator operation.

15. A line circuit for a key telephone system according to claim 14 further comprising means for holding said second transistor deactivated during silent intervals in said ringing signal.

16. A line circuit for a key telephone system according to claim 15 further comprising a second magnetic memory device coupled to said line circuit for detecting a hold request, a fourth transistor connected in parallel with the tip and ring leads in said line circuit, an impedance in series with said fourth transistor, means for activating said fourth transistor in response to said hold request detection, a fifth transistor connected in parallel with said fourth transistor, and means for activating said fifth transistor to deactivate said fourth transistor when said detected hold request is discontinued.

17. A line circuit for a key telephone system according to claim 16 further comprising a sixth transistor, a second timing transient means coupled to said sixth transistor for connection to said multivibrator when said sixth transistor is activated and means responsive to said second memory device for activating said sixth transistor when said memory device detects a hold request.

18. In a key telephone line circuit, a holding bridge comprising first and second transistors connected in parallel for respectively holding and releasing a connection to said line, holding impedance means connectable to said line in response to the operation of said first transistor, first magnetic core means for operating said first transistor to couple said holding impedance to said line, and second magnetic core means operating said second transistor to uncouple said holding impedance from said line.

19. A key telephone line circuit according to claim 18 further comprising a capacitance, a resistance connected in parallel with said capacitance and means for connecting said parallel combination in series with said second transistor for retiring said second transistor.

20. A line circuit for a key telephone system comprising hold circuit means, magnetic core memory means for detecting ringing, for indicating the state of the line circuit, and for controlling said hold circuit means, a common memory drive means for continually resetting said core memory means, and means for controlling said memory drive means to prevent resetting of said core means.

21. A line circuit for a key telephone system comprising a ringing detector magnetic core, means for setting said core in response to ringing signals, means for periodically resetting said core, a signal lamp, lamp control means for flashing said lamp in response to detection of said ringing signals, and means for causing said lamp control means to continue to flash said lamp during the silent intervals of the ringing signals.

22. A line circuit for a key telephone system comprising ringing detector means including a ringing detector magnetic core, hold bridge circuit means including a hold magnetic core, memory circuit means including a line memory magnetic core, a memory driving circuit for applying resetting pulses to said cores, means for interrupting the application of said resetting pulses, a signal lamp, and signal lamp control means responsive to said magnetic cores for determining the operation of said lamp in distinct manners.

References Cited

UNITED STATES PATENTS

| | | | |
|---|---|---|---|
| 3,246,082 | 4/1966 | Levy | 179—99 |
| 3,304,376 | 2/1967 | Truby | 179—42 |

FOREIGN PATENTS

| | | |
|---|---|---|
| 1,174,373 | 7/1964 | Germany. |

KATHLEEN H. CLAFFY, *Primary Examiner.*

L. A. WRIGHT, *Assistant Examiner.*

U.S. Cl. X.R.

179—84, 42